United States Patent
Kawada (10) Patent No.: US 8,317,173 B2
(45) Date of Patent: Nov. 27, 2012

(54) VIBRATION DAMPING SYSTEM

(75) Inventor: Masayoshi Kawada, Kawaski (JP)

(73) Assignee: Bridgestone Corporation, Tokyo (JP)

( * ) Notice: Subject to any disclaimer, the term of this patent is extended or adjusted under 35 U.S.C. 154(b) by 338 days.

(21) Appl. No.: 12/442,313

(22) PCT Filed: Sep. 21, 2007

(86) PCT No.: PCT/JP2007/068416
§ 371 (c)(1),
(2), (4) Date: Apr. 24, 2009

(87) PCT Pub. No.: WO2008/035772
PCT Pub. Date: Mar. 27, 2008

(65) Prior Publication Data
US 2010/0084797 A1   Apr. 8, 2010

(30) Foreign Application Priority Data

Sep. 22, 2006  (JP) ................................. 2006-256573
Aug. 27, 2007  (JP) ................................. 2007-220331

(51) Int. Cl.
*F16F 1/40*   (2006.01)
*F16F 7/00*   (2006.01)

(52) U.S. Cl. ..................... 267/294; 267/293; 267/140.4; 267/141.1; 267/152; 248/575

(58) Field of Classification Search .................. 267/293, 267/294, 140.4, 141.1, 141, 140.3, 136, 139, 267/140, 140.11, 151, 152; 248/560, 575, 248/576, 638

See application file for complete search history.

(56) References Cited

U.S. PATENT DOCUMENTS 28,619 A * 6/1860 Vose ............................. 267/293
2,187,156 A * 1/1940 Johnson ....................... 267/294
(Continued)

FOREIGN PATENT DOCUMENTS
EP       0 619 441 A1   10/1994
(Continued)

OTHER PUBLICATIONS

Japanese Office Action issued in Application No. 2007-220331 dated Jun. 5, 2012.
(Continued)

*Primary Examiner* — Thomas J Williams
(74) *Attorney, Agent, or Firm* — Sughrue Mion, PLLC (57) ABSTRACT

A vibration damping system includes a laminated body (3) formed by alternately laminating rigid hard plates (4) and viscoelastic soft plates (5), and pair of shoe plates (1, 2) at both ends in the laminating direction of the laminated body (3), to form a vibration damping body (6). The show plates (1, 2) are connected to each other by a displacement restriction member (7), so as to applying a pre-compression to the laminated body. The vibration damping body (6) is divided into a plurality of segments (3A, 3B, 3C) in the laminating direction, for allowing the vibration-proof main body (6) to be separated and displaced at the parting faces (8), without causing an excessive tensile force in the vibration damping system, even if the displacement restriction member (7) has worn to degrade the pre-compression function and a tensile force is applied due to a prying deformation. Thus, the soft members (5) of the laminated body (3) are effectively protected from isostatic fracture, to provide a significantly improved durability of the vibration damping system.

7 Claims, 6 Drawing Sheets

U.S. PATENT DOCUMENTS

| | | | |
|---|---|---|---|
| 3,492,745 A * | 2/1970 | Buckstead | 267/140.11 |
| 3,677,535 A * | 7/1972 | Beck | 267/294 |
| 3,997,151 A * | 12/1976 | Leingang | 267/294 |
| 5,641,153 A * | 6/1997 | Gwinn | 267/294 |
| 6,511,037 B1 * | 1/2003 | Newman | 267/140.3 |
| 7,201,367 B2 * | 4/2007 | Wietharn | 267/141 |
| 2004/0262830 A1 | 12/2004 | Maeno et al. | |

FOREIGN PATENT DOCUMENTS

| | | |
|---|---|---|
| JP | 62-141943 U | 9/1987 |
| JP | 64-35134 A | 2/1989 |
| JP | 02132145 U | 11/1990 |
| JP | 2000240722 A | 9/2000 |
| JP | 2005-23972 A | 1/2005 |
| JP | 2006-57833 A | 3/2006 |
| JP | 2006161948 A | 6/2006 |
| WO | 91/12440 A1 | 8/1991 |

OTHER PUBLICATIONS

Extended Supplementary European Search Report dated Sep. 5, 2012, issued in European Patent Application No. 07807747.6.

* cited by examiner

FIG. 6 PRIOR ART

VIBRATION DAMPING SYSTEM

CROSS REFERENCE TO RELATED APPLICATIONS

This application is a National Stage of International Application No. PCT/JP2007/068416 filed Sep. 21, 2007, claiming priority based on Japanese Patent Application Nos. 2006-256573 and 2007-220331, filed Sep. 22, 2006 and Aug. 27, 2007, respectively, the contents of all of which are incorporated herein by reference in their entirety.

TECHNICAL FIELD

The present invention relates to a vibration damping system comprising a vibration damping body including a laminated body wherein a plurality of hard plates having rigidity and a plurality of soft members having viscoelasticity are alternately laminated with each other, and a pair of shoe plates on both end portions of the laminated body in the laminating direction, and further comprising a displacement restriction member for connecting the shoe plates with each other for providing a pre-compression to the laminated body.

BACKGROUND ART

There have been proposed various types of vibration damping system, such as a vibration damping system for protecting buildings from earthquakes, a vibration damping system arranged between a bridge and bridge piers, a vibration damping system for a vibration generating section of a vehicle, such as an engine, and a vibration damping system for a suspended elements. For example, there is known a vibration damping system that includes a laminated body wherein a plurality of hard plates having rigidity and a plurality of soft members having viscoelasticity are alternately laminated with each other, and a pair of shoe plates that are arranged on both end portions in the laminating direction of the laminated body. Such a vibration damping system has high durability against compression force in the laminating direction, and is thus used in various application fields. However, while exhibiting high durability against compression force in the laminating direction, the vibration damping system of the type wherein hard plates and soft members are alternately laminated with each other is very weak to tensile force in the laminating direction. In view of such a problem, as disclosed in JP 2006-057833A, for example, the applicant already proposed a vibration damping system including a displacement restriction member in the form of a chain, so as to provide improved durability to tensile force in the laminating direction.

Figure 6:
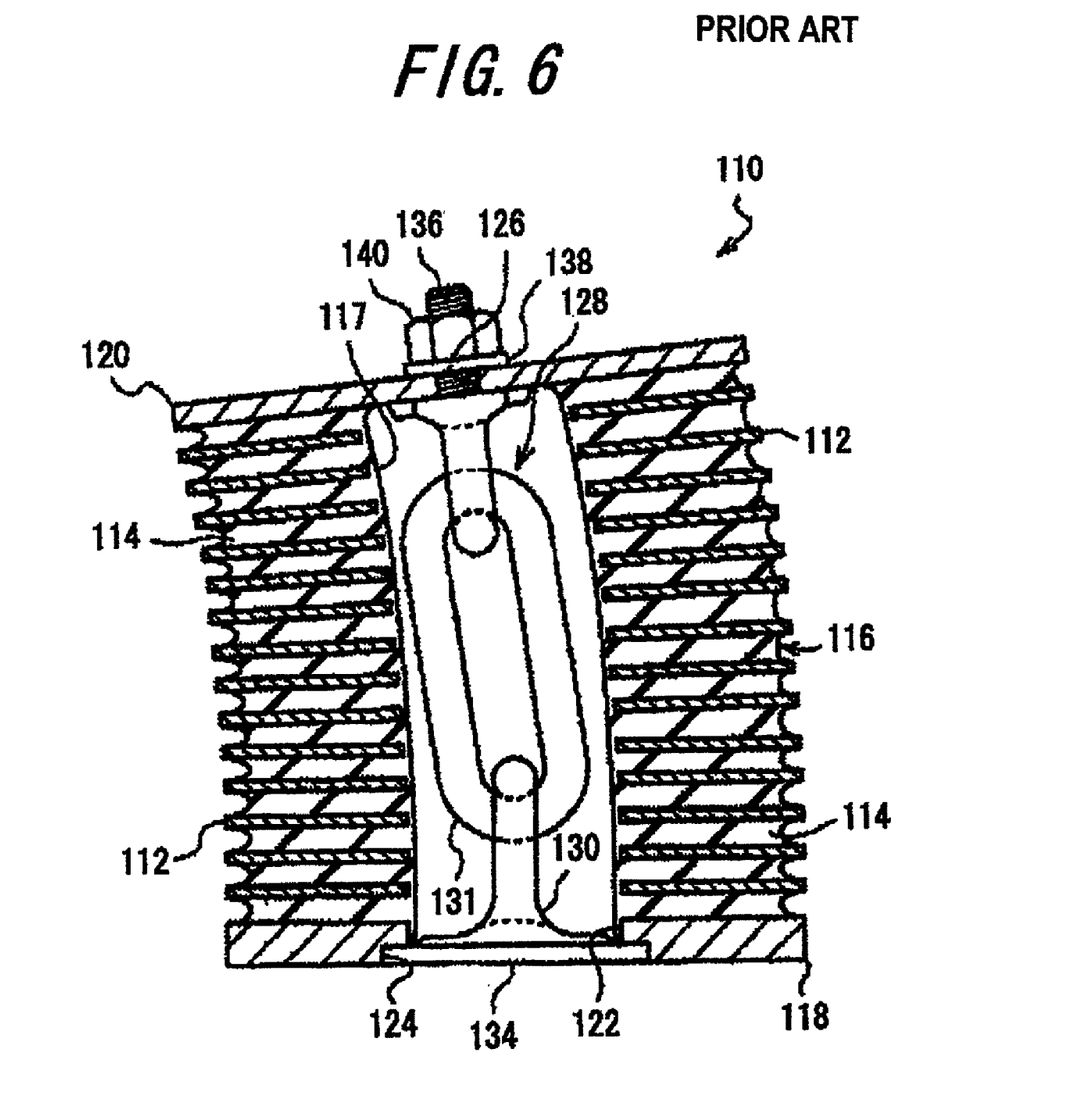
FIG. 6 is a sectional view of a conventional vibration damping system.

The vibration damping system disclosed in JP 2006-057833A is explained below with reference to FIG. 6. This vibration damping system 110 includes a laminated rubber body 116 arranged between lower and upper shoe plates 118, 120 as being applied with predetermined pre-compression in the laminating direction, and a displacement restriction member in the form of a link chain 128 connecting the lower and upper shoe plates 118, 120. Here, the laminated rubber body 116 is comprised of hard plates 112 and soft members in the form of rubber plates 114, which are alternately laminated with each other. The laminated rubber body 116 can be placed under a pre-compressed state, by tightening a nut 140 to a bold shaft 136 at the upper end portion of the link chain 128 between the lower and upper shoe plates 118, 120.

With such configuration of the vibration damping system according to the applicant's earlier proposal, when vibration with large amplitude in the shearing direction is applied to cause prying deformation in the laminated rubber body 116 and apply tensile force to the laminated rubber body 116, the link chain 128, which is always maintained in a tension state between the lower and upper shoe plates 118, 120 due to the restoring compression force, serves to partly support the tensile force, so as to reduce the tensile stress (alternatively referred to as "isostatic stress") occurring in the laminated rubber body 116 in the laminating direction.

DISCLOSURE OF THE INVENTION

It is an object of the present invention to further improve the vibration damping system according to the applicant's earlier proposal, in such a manner that, even if partial tensile force is generated upon occurrence of the prying deformation, or the pre-compression function deteriorates due to the wear of the displacement restriction member, the vibration damping system as being applied with the tensile force is still capable of preventing damages to the laminated rubber body comprised of hard members and soft members, and suppressing dislocation in the shearing direction.

According to the present invention, there is provided a vibration damping system, which comprises a vibration damping body including a laminated body wherein a plurality of hard plates having rigidity and a plurality of soft members having viscoelasticity are alternately laminated with each other, and a pair of shoe plates on both end portions of the laminated body in the laminating direction, and further comprises a displacement restriction member for connecting the pair of the shoe plates with each other for providing a pre-compression to the laminated body, wherein the vibration damping body is divided into a plurality of segments in the laminating direction.

The present invention is based on a vibration damping system, which comprises a vibration damping body including a laminated body wherein a plurality of hard plates having rigidity and a plurality of soft members having viscoelasticity are alternately laminated with each other, and a pair of shoe plates on both end portions of the laminated body in the laminating direction, and which further comprises a displacement restriction member for connecting the pair of the shoe plates with each other for providing a pre-compression to the laminated body. In this particular type of vibration damping system, according to the present invention, the vibration damping body is divided into a plurality of segments in the laminating direction. With such configuration of the present invention, even if the laminated rubber body is applied with a tensile force due to degraded pre-compression function as a result of wear of the displacement restriction member, or due to the occurrence of prying deformation, since the segments of the vibration damping body undergo isolated displacement at the parting faces, the laminated rubber body is not subjected to a severe tensile force, and the soft members are protected from isostatic fracture, thereby drastically improving the durability.

Here, the meaning of the technical term "isostatic fracture" will be explained below. In ordinary vibration damping rubber which essentially does not include hard members, there is a relatively large free surface area. Thus, when a tensile force is applied to the rubber, based on its entering deformation into the inside of the external rubber portion, the rubber is allowed to undergo an elongation deformation without causing change in volume. In contrast, in the vibration damping system wherein a plurality of hard plates are embedded to have a large restraining surface area for the soft members made of rubber, as in the structure to which the present invention is applicable, when a tensile force is applied, the structure is allowed to deform in the region adjacent to the outer periphery, though the structure assumes a tensile state in its inside. In such a state, when the stress level, or the isostatic stress level, increases beyond a threshold level, there is an instance wherein the soft members due to its increased volume undergoes a fracture. This sort of phenomena is called as "isostatic fracture."

It is preferred that the hard plates are arranged in each parting face of each segment in the vibration damping body. In this instance, it is possible to eliminate the risk of wear or the like of the soft members, which would occur if the soft members are exposed. Moreover, due to the wear resistance of the hard plates, the system can be used for a prolonged time, even if separation occurs at the parting face or dislocation occurs in the shearing direction or rotating direction.

It is preferred that, among the hard plates arranged in each parting face of each segment, the hard plates situated adjacent to each other are provided with a restriction means for restricting a movement in at least one of a relative shearing direction and a relative rotating direction. In this instance, the opposite hard plates are in abutment with each other to positively and firmly restrict any movement between the neighboring segments at the parting face in the shearing direction.

It is preferred that the displacement restriction member is arranged in an interior space of the laminated body. In this instance, as opposed to an arrangement wherein the displacement restriction member is disposed on the outside of the laminated body, the installation space for the displacement restriction member can be tightly sealed from outside, thereby preventing entry of foreign matters. It is thus possible to protect the displacement restriction member from functional degradation, as a result of rust formation, corrosion or embrittlement due to environmental influences.

It is preferred that the displacement restriction member comprise a link chain. In this instance, a general purpose element readily available on the market can be used to positively prevent displacement in the tensile direction under a moderate restraining force, while allowing deformation in the shearing direction. Also, the displacement restriction member in the form of a link chain provides a positive restraining force and flexibly functions in response to complex displacement in multiple directions.

It is preferred that the hard plates in the laminated body are arranged at mutually different pitch distances. When the hard plates in the laminated body are arranged at mutually different pitch distances, it is possible to equalize the amount of the deformation of the hard plates due to the bending moment of the laminated body, to disperse the isostatic stress between the hard plates, to improve the fatigue strength of the laminated body, and to prolong the service life thereof.

It is preferred that the hard plates for the different segments are arranged at mutually different pitch distances. In this instance, as in the above-mentioned embodiment, it is possible to improve the fatigue strength of the laminated body and prolong the service life thereof, besides that the tuning range of the segments can be widened.

It is preferred that the vibration damping body is divided at a plurality of dividing locations. In this instance, since the end portions of the laminated body can be commonly used as the lower and upper portions and combined with an intermediate portion with the same diameter and a different length, it is possible to effectively reduce the production cost of the vibration damping system. Moreover, it is possible to divide the vibration damping body between the laminated body and the shoe plates, irrespectively of whether the vibration damping body is divided at a plurality of dividing locations.

It is preferred that a cover member is provided for covering each dividing location of the vibration damping body from an outer side. In this instance, even if separation occurs between the parting faces, it is possible to prevent entry of foreign matters into the space between the separated parting faces, thereby providing a stable performance and excellent durability.

It is preferred that the cover is made of rubber, for example, and is in tight contact with a periphery of the vibration damping body, by its own resilient shrinkage force. In this instance, the cover can be easily and quickly brought into sufficiently tight contact with the soft members of the vibration damping body and mounted thereon, to effectively prevent entry of foreign matters, without requiring special processing for the mounting.

BRIEF DESCRIPTION OF THE DRAWINGS

The present invention will be further described below with reference to preferred embodiments shown in the accompanying drawings, wherein.

REFERENCE NUMERALS

1 Upper shoe plate
1A Flange member
1C Recess for the flange member
2 Lower shoe plate
2A Flange member
3 Laminated body
3A Upper segment
3B Intermediate segment
3C Lower segment
4 Hard plates
5 Soft members
6 Vibration damping body
7 Link chain
8 Parting faces
9 Bolt member
10 Nut member
11 Washer
12 Restricting portion
13 Centering portion
14 Mounting holes
15 Cavity
16 Bolt hole

BEST MODE FOR CARRYING OUT THE INVENTION

There is shown a basic structure of the vibration damping system according to the present invention, wherein a plurality of hard plates 4 having rigidity and a plurality of soft members 4 having viscoelasticity are alternately laminated with each other to form a laminated body 3. Upper and lower shoe members 1, 2 forming a pair are arranged on both end portions of the laminated body 3 in the laminating direction. The laminated body 3 and the upper and lower shoe plates 1, 2, as a whole, constitute a vibration damping body 6. A displacement restriction member 7 is arranged to connect the shoe plates 1, 2 of the vibration damping body 6 with each other, to apply a pre-compression to the laminated body 3. According to the present invention, the laminated body 3 is divided into a plurality of segments, e.g., three segments 3A, 3B, 3C as shown in the drawings.

First Embodiment

Figure 1:
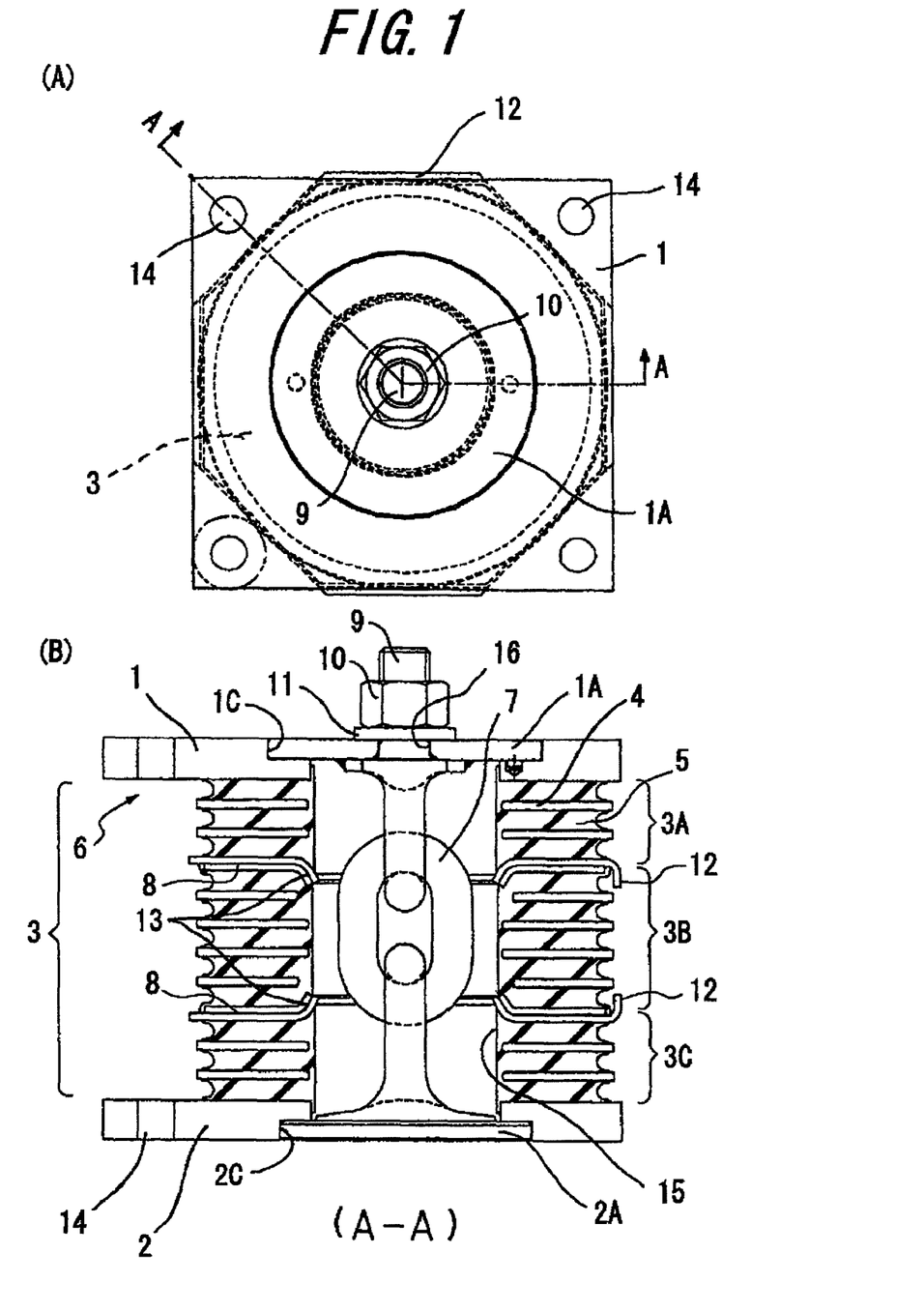
FIGS. 1(A) and 1(B) are a plan view and a longitudinal sectional view of the vibration damping system according to a first embodiment of the present invention, respectively.

As shown in FIG. 1(B), hard plates 4 having rigidity and soft members 4 having viscoelasticity are alternately laminated to form a laminated body 3, and upper and lower shoe members 1, 2 are arranged on both end portions of the laminated body 3 to form the vibration damping body 6. The hard plates 4 may be comprised of a suitable metal material, such as iron, aluminum or the like. Besides a metal material, the hard plates 4 may be comprised of a resin material, such as nylon, and adhered to the soft members is the case with the metal material.

The soft members 5 having viscoelasticity are generally formed by molding various types of vulcanized rubber as the raw material. Such rubber material may include, for example, ethylene-propylene rubber (EPR, EPDM), nitrile rubber (NBR), butyl rubber, halogenated butyl rubber, chloroprene rubber (CR), natural rubber (NR), isoprene rubber (IR), styrene-butadiene rubber (SBR), butadiene rubber (BR), and a blend thereof. Alternatively, there may be used a suitable elastomer material other than the rubber material.

The laminated body 3 exhibits a substantially cylindrical shape as can be seen from the plan view of FIG. 1(A), and has a cavity 15 that extends through the laminated body 3 in the laminating direction. In the laminated body 3, the soft members 5 and the hard plates 4 are adhered to each other, for example, by vulcanization. The shoe plates 1, 2, which are arranged in the upper and lower end portions in the laminating direction of the laminated body 3, are comprised of metal plates, and adhered to the soft members 5 by vulcanization.

As for the lower shoe plate 2, the shoe plate 1 to be described below with reference to FIGS. 1(A) and 1(B) is used upside down, thereby allowing the same member to be used commonly. The top face of the upper shoe plates 1 and the bottom face of the lower shoe plate 2 are formed, respectively, with recesses 1C, 2C for accommodating flange members corresponding to the cavity 15, wherein the recess 2C of the lower shoe plate 2 is the recess 1C of the upper shoe plate 1 when the latter is used upside down.

In the recess 2C of the lower shoe member 2, a flange member 2A at the lower end portion of the displacement restriction member in the form of a link chain 7 is fitted. Similarly, in the recess 1C of the upper shoe member 1, a flange member 1A is fitted and secured by fasteners or the like. The flange member 1A has a center bolt hole 16, into which is inserted a bolt members 9 provided at the upper end portion of the link chain 7 forming the displacement restriction member. A nut member 10 is threadedly engaged with the bolt member 9, with a washer 11 interposed therebetween. The washer 11 functions as a tension adjusting member. With such an arrangement, the laminated body 3 can be applied with a predetermined pre-compression, through the upper and lower shoe plates 1, 2.

By placing the laminated body 3 under pre-compression in the manner explained above, it is possible to partly cancel the tensile force acting on the laminated body 3 and thereby reduce the input force to the laminated body 3, so that the laminated body 3 exhibits a higher resistance to the tensile force by allowing the link chain 7 to reduce the isostatic stress in the laminated body 3.

As explained above, according to the present invention, the laminated body 3 is divided in the laminating direction into a plurality of segments 3A, 3B, 3C. In the illustrated embodiment, the laminated body 3 is divided into three segments 3A, 3B, 3C. However, the laminated body 3 may be divided at a single location or at three or more locations, into a different number of segments.

Figure 2:
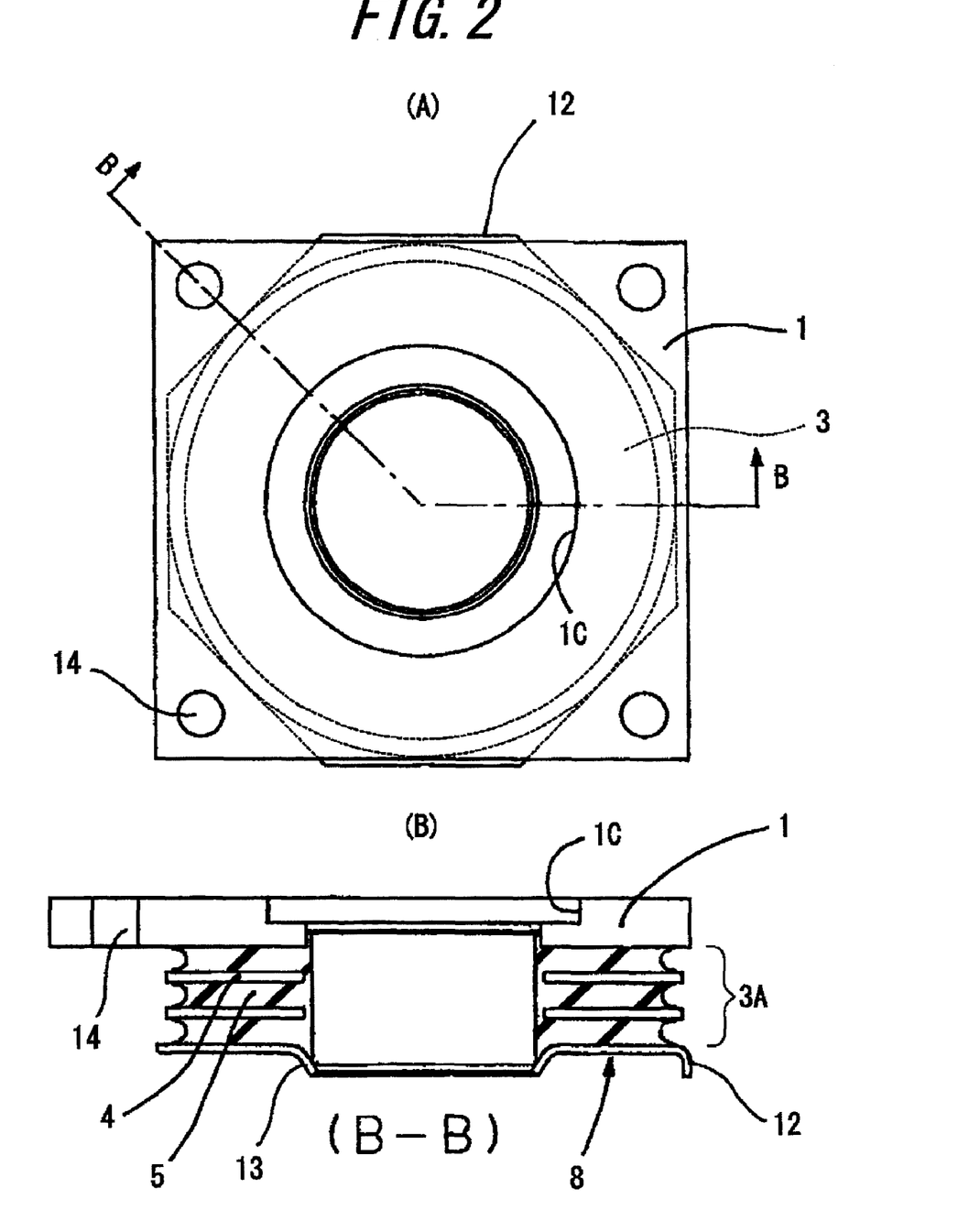
FIGS. 2(A) and 2(B) are a plan view and a longitudinal sectional view of the upper portion (or the lower portion), respectively.
Figure 3:
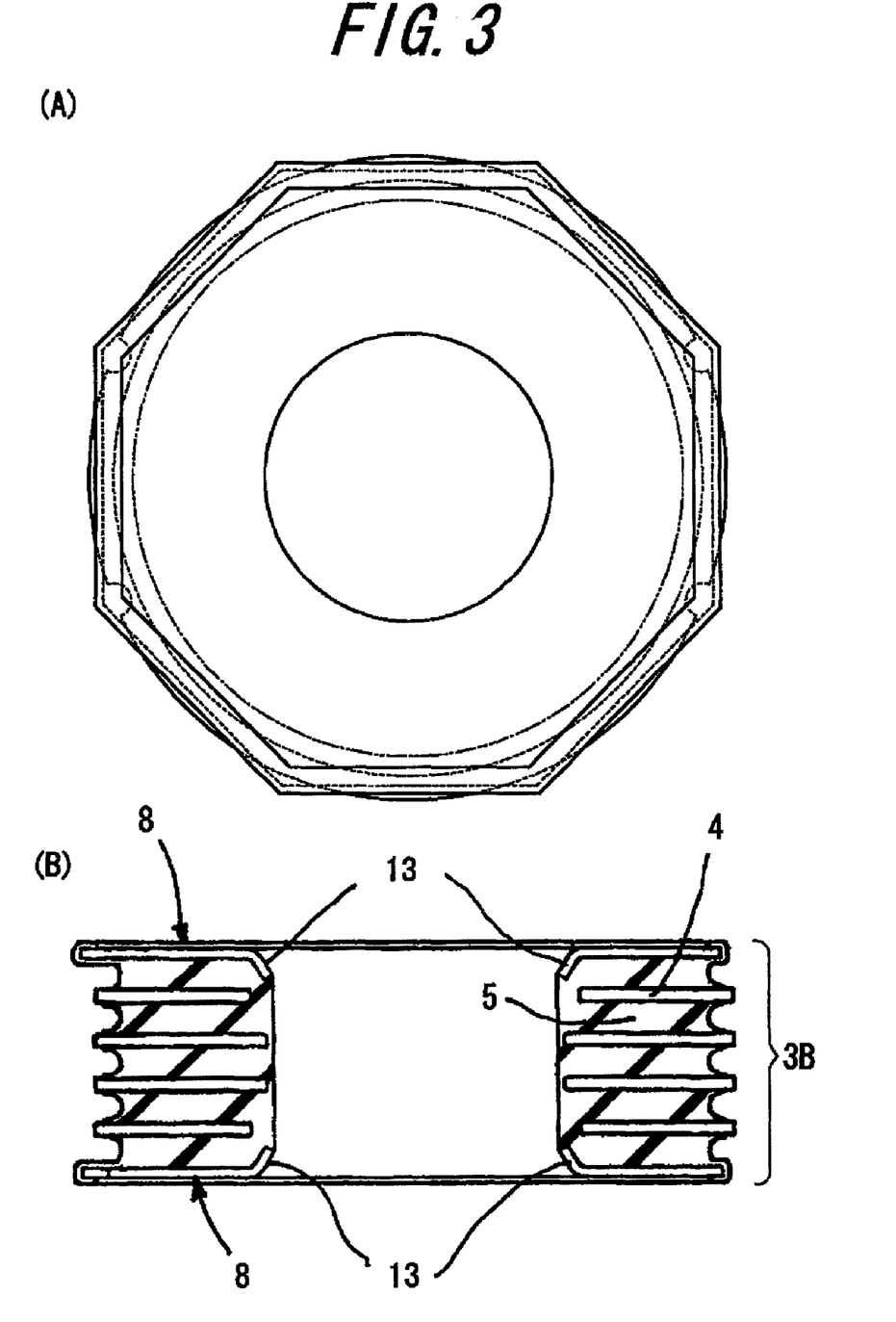
FIGS. 3(A) and 3(B) are a plan view and a longitudinal sectional view of the intermediate portion, respectively.

In the present embodiment, the hard plates 4 are arranged on opposite parting surfaces 8 of the segments. The upper segment 3A has a structure as shown in FIGS. 2(A) and 2(B). The lower segment 3C has the same structure as the upper segment 3A which, however, is used upside down. The intermediate segment 3B has a structure as shown in FIG. 3.

These segments 3A, 3B, 3C are stacked with each other with the hard plates 4 interposed between the parting faces 8, to form the desired vibration damping system. Reference numeral 14 denotes mounting holes used for mounting the vibration damping system to a supporting bracket, etc.

The hard plates 4 arranged on the parting face 8 of the segments 3A, 3B, 3C may be formed, for example, to have an outer contour of octagonal shape, as shown in the plan view of FIG. 1(A). On every other sides of the octagon, the hard plates 4 are provided with restricting portions 12 that are formed by bending in the laminating direction so that the restricting portions 12 of the hard plate 4 is engageable with the restricting portions 12 of the opposite hard plate 4 through the parting faces 8 between the neighboring segments. As shown in the drawings, the outer peripheral sides of the hard plates 4 at the parting faces 8 of the upper and lower segments 3A, 3C are bent to surround the outer peripheral sides of the hard plates 4 at the parting faces 8 of the intermediate segment 3B. The hard plates 4 on the parting faces 8 of the segments 3A, 3B, 3C each has a substantially circular inner periphery, which is formed with a centering portion 13 in the form of an opposite tapered face.

With such a configuration, the vibration damping body comprised of the segments 3A, 3B, 3C ensures a prolonged service life of the vibration damping system even if upon occurrence of separation or relative displacement in the shearing or rotating direction at the parting faces, due to a sufficient wear resistance between the hard plates. Furthermore, the restricting portions 12 explained above serves to positively and firmly restrict the relative displacement between the neighboring segments in the shearing or rotating direction.

The provision of the centering portions 13 for the hard plates 4 allows a proper positioning of the parting faces 8 of the segments 3A, 3B, 3C to be achieved whenever the segments are stacked with each other, and serves to maintain proper stacking positions of the segments 3A, 3B, 3C even if separation of the segments once occurred and the segments are then re-stacked with each other. The restricting portion 12 may be formed on the outer peripheral sides of the hard plates with a suitably determined shape different from the octagonal shape as seen in the plan view, such as non-circular shape. Alternatively, the restricting portions 12 may have a male/female mating structure formed on the outer peripheral sides of the hard plates 4 so as to be engageable with each other.

In this way with the vibration damping system according to the present embodiment, even if the displacement restriction member in the form of the link chain 7 has worn and the vibration damping system is thus applied with a tensile force, the segments 3A, 3B, 3C are allowed to separate from each other, thereby preventing occurrence of isostatic fracture of the soft members 5 made of rubber or the like. Moreover, as explained previously with reference to FIG. 6, which shows the basic structure to which the present invention is applied, if the vibration damping system is subjected to a prying external force such that the portion of the laminated body on the left side in the drawings is applied with a compression force and the portion of the laminated body on the right side in the drawings is applied with a tensile force, the vibration damping system according to the present invention is still effectively protected from isostatic fracture. This is because, on such occasion, the provision of the parting faces 8 allows the segments 3A, 3B, 3C to be separated from each other, thereby suppressing input of tensile force to the soft members 5 made of rubber, for example. It is needless to mention that when an excessive tensile force is applied, the displacement restriction member in the form of the link chain 7 exhibits a strong resistance, while a strong vibration damping function is effectively achieved in response to a compression load, by the alternately laminating arrangement of the soft members 5 and the hard plates 4 with each other.

Since the displacement restriction member is comprised of a link chain 7, it is possible to use a general purpose element readily available on the market, so as to positively prevent displacement in the tensile direction under a moderate restraining force, while allowing deformation in the shearing direction. The link chain 7 also provides a positive restraining force and flexibly functions in response to complex displacement in multiple directions.

Since the link chain 7 forming the displacement restriction member is arranged in the interior space 15 defined by the cavities in the segments 3A, 3B, 3C, the space 15 for installing the displacement restriction member is tightly sealed by the flange members 1A, 2A from outside, thereby preventing entry of foreign matters into the space 15. It is thus possible to effectively protect the link chain 7 from functional degradation as a result of rust formation, corrosion or embrittlement due to environmental influences.

Furthermore, although illustration in the drawing is omitted, the hard plates 4 in the laminated body 3 may be arranged at mutually different pitch distances. Thus, for example, the pitch distance may be changed stepwise or in a suitably determined mariner such that the laminated body 3 as a whole has an increased thickness of the soft members in a region subjected to a high isostatic stress. Such an arrangement makes it possible to equalize the amount of the deformation of the hard plates due to the bending moment of the laminated body 3, to disperse the isostatic stress between the hard plates with different pitch distance, to improve the fatigue strength of the laminated body 3 and prolong the service life thereof.

The hard plates 4 of the segments 3A, 3B, 3C may be arranged at pitch distances, which are mutually different from each other to each segment. Thus, for each segment, the hard plates may be arranged at a regular pitch distance, or at different pitch distances. The pitch distances may be different from each other stepwise, or in a suitably determined manner so as to equalize the load. BY such an arrangement, as in the above-mentioned embodiment, it is possible to improve the fatigue strength of the laminated body 3 and prolong the service life thereof, besides that the tuning range of the segments 3A, 3B, 3C can be widened.

While a preferred embodiment of the present invention has been explained above, suitable changes may be made with respect to the following features.

Shape of the hard plates (although a circular shape in the plan view is preferred, non-circular shape is not excluded, and changes may be made of the thickness, etc.);

Type or material of the hard plate (suitable material having rigidity can be used);

Shape, type or material of the soft members having viscoelasticity (vulcanizable rubber, synthetic rubber, or other soft materials not subjected to vulcanization may be used);

Manner of adhering the hard plates and soft members (vulcanization or other suitable adhesion method);

Shape of the shoe plate (suitable plan view shape other than rectangular shape in the embodiment may be adopted, and the displacement restriction member may be directly fixed to the shoe plate, other than accommodating the flange members in the recesses);

Type or material of the shoe plates;

Type or shape of the displacement restriction member (although a link chain is preferred, other suitable link mechanism may also be used provided that displacement in the compression direction or transverse direction is permitted);

Manner of providing pre-compression to the laminated body (other than selection of the tightening degree of the nut to the bold member of the displacement restriction member, the thickness of the washer may be changed to adjust the pre-compression);

The number of segments in the laminated body (divided at two or more locations)

Shape of the restricting portion in the hard plates on the parting faces (other than engagement between the non-circular sides in the plan view, interengageable restricting portion may be provided for parts of non-circular shape);

Shape of the interior space in the laminated body;

Pitch distances between the hard plates of the laminated body (gradually increasing or decreasing distance, or suitably determined distance);

Pitch distance, etc., between the hard plates in each segment of the laminated body.

In the illustrated embodiment of the present invention, the vibration damping body 6 is divided into a plurality of segments within the laminated body 3. Alternatively, however, the vibration damping body 6 may be divided into a plurality of segments between the laminated body and the upper and lower shoe plates. In this instance also, it is preferred that the hard plates are provided for each parting face on both sides.

Second Embodiment

Figure 4:
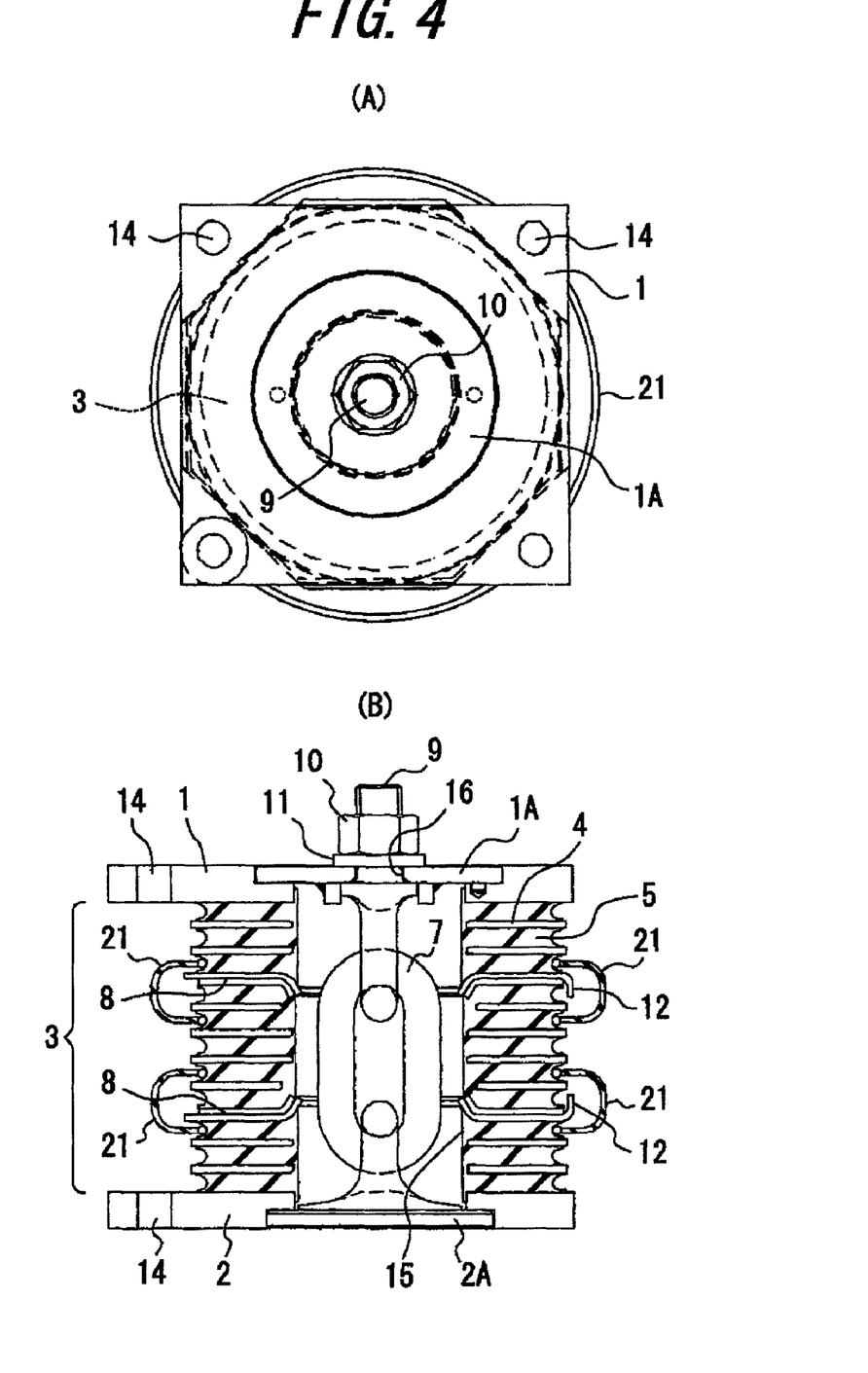
FIGS. 4(A) and 4(B) are a plan view and a longitudinal sectional view of the vibration damping system according to a second embodiment of the present invention, respectively.

FIGS. 4(A) and 4(B) are a plan view and a longitudinal sectional view of the vibration damping system according to a modification of the above-described embodiment of the present invention, respectively. In this modified embodiment, each dividing location of the vibration damping body 6, i.e., each parting face 8 in the laminated body 3, is covered over the entire periphery and sealed from outside, by a cover member 21 that is made of a suitable material, such as rubber film body. The cover member 21 functions as a dust cover for preventing entry of foreign matters into a space surrounding the parting face 8. The cover member 21 may be comprised of a toroidal rubber film having a bellow shape with a single protrusion. It is further preferred that the cover member is brought into contact with the outer periphery of the vibration damping body 6, bridging across the parting faces 8, under its own resilient shrinkage force, from the viewpoint of achieving a sufficiently tight contact to the vibration damping body 6, (Variant)

Figure 5:
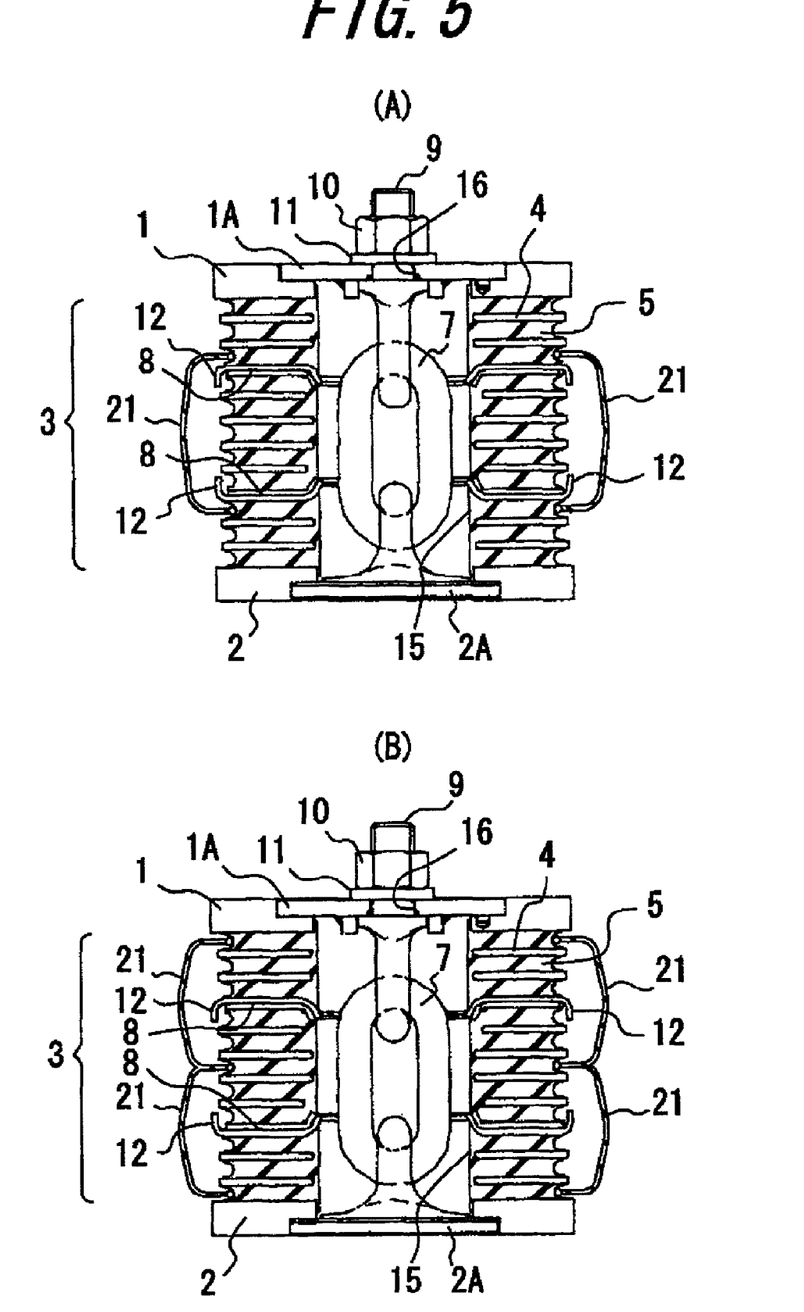
FIGS. 5(A) and 5(B) are longitudinal sectional views of a variant of the second embodiment.

In the embodiment shown in FIGS. 4(A) and 4(B), the cover 21 is designed to have a required minimum axial dimension so that a single cover member 21 covers a single parting face 8. However, the cover member 21 may be designed to have an extended axial dimension so that a single cover member 21 covers two parting face 8 simultaneously, as shown in FIG. 5(B). Also, there may be provided two cover members each having an increased axial dimension so as to cover each parting face over an increased range.

However, when the possibility of interference between the cover member 21 and structural members adjacent to the vibration damping system is to be taken into account, it is preferred that the cover member is designed to have a smaller dimension as shown in FIGS. 4(A) and 4(B).

The invention claimed is:

1. A vibration damping system comprising: a vibration damping body including a laminated body wherein a plurality of hard plates having a rigidity and a plurality of soft members having a viscoelasticity are alternately laminated with each other, and a pair of shoe plates on both end portions of the laminated body in the laminating direction, and further comprising a displacement restriction member for connecting the pair of the shoe plates with each other for providing a pre-compression to the laminated body, wherein the vibration damping body is divided into a plurality of segments in the laminating direction, the hard plates are arranged on each parting face in the vibration damping body of the segment, the hard plates on parting faces of adjacent segments directly contact each other and are provided with a restriction portion that restricts a relative movement in at least one of a shearing direction and a rotating direction, and each of said segments is an integral unit comprising a plurality of said hard plates and a plurality of said soft members, each of said hard plates and said soft members are alternately laminated with each other.

2. A vibration damping system according to claim 1, wherein the displacement restriction member is arranged in an interior space of the laminated body.

3. A vibration damping system according to claim 1, wherein the displacement restriction member comprise a link chain.

4. A vibration damping system according to claim 1, wherein the vibration damping body is divided at a plurality of dividing locations.

5. A vibration damping system according to claim 1, further comprising a cover member for covering each dividing location of the vibration damping body from an outer side.

6. A vibration damping system according to claim 5, wherein the cover is in tight contact with a periphery of the vibration damping body, by its own resilient shrinkage force.

7. A vibration damping system according to claim 1, where at least one of the hard plates arranged at the parting face has a non-circular shape as seen in plan view, and is provided with the restriction portion on an outer peripheral side thereof.

* * * * *